J. R. DUNLAP.
COMBINED CULTIVATOR AND HARROW.
No. 181,654. Patented Aug. 29, 1876.
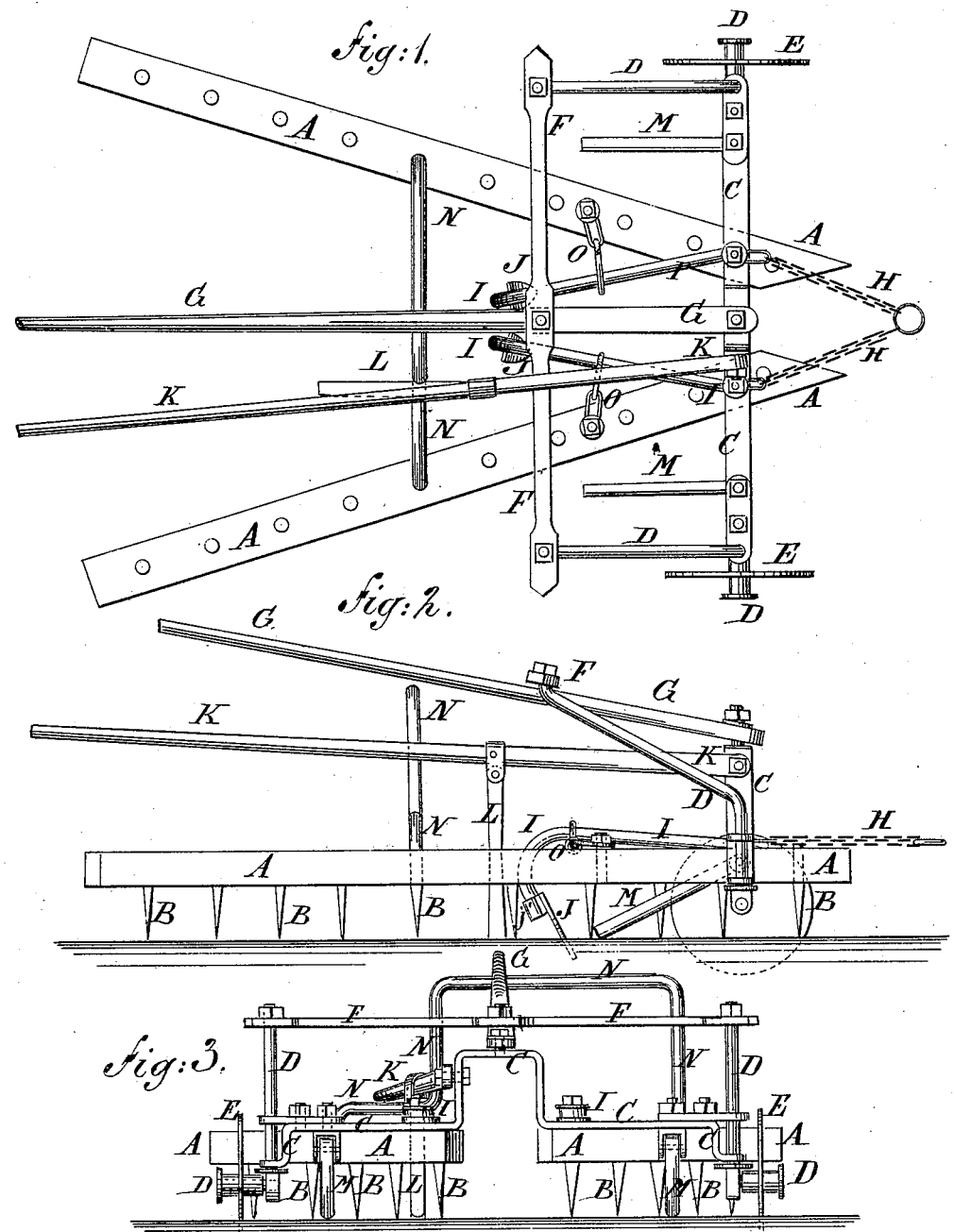

UNITED STATES PATENT OFFICE.

JOHN R. DUNLAP, OF SHERMAN, ILLINOIS.

IMPROVEMENT IN COMBINED CULTIVATOR AND HARROW.

Specification forming part of Letters Patent No. 181,654, dated August 29, 1876; application filed March 6, 1876.

*To all whom it may concern:*

Be it known that I, JOHN R. DUNLAP, of Sherman, in the county of Sangamon and State of Illinois, have invented a new and useful Improvement in Combined Cultivator and Harrow, of which the following is a specification:

Figure 1 is a top view of my improved machine. Fig. 2 is a side view of the same. Fig. 3 is a front view of the same. Fig. 4 is a detail rear view of one of the cultivating-plows. Fig. 5 is a section of the same, taken through the line $x$ $x$, Fig. 4.

Similar letters of reference indicate corresponding parts.

The object of this invention is to furnish an improved implement for cultivating corn and other crops planted in hills or drills, and which shall be so constructed that it may thoroughly loosen up the soil and destroy the grass and weeds, and at the same time may be easily guided and controlled and freed from rubbish.

The invention will first be described in connection with the drawing, and then pointed out in the claims.

A represents the side bars or beams of an ordinary V-harrow, which are provided with teeth B, in the usual way. The forward ends of the bars A do not meet, but are at such a distance apart that the row of plants may pass between them. The forward ends of the bars A are connected and held in proper relative position by a bar, C, the middle part of which is arched to pass over the plants without injuring them, and its ends project and have bearings formed in and attached to them to receive the vertical parts of the crank-axles D. Upon the journals of the axles D revolve the small steel wheels E, which are made similar to rotary cutters. The upper arms of the crank-axles D are made long, extend to the rearward, and incline upward, and to their ends are pivoted the ends of a cross-bar, F. To the center of the cross-bar F, and to the center of the arch of the bar C, is pivoted a lever, G, the rear end of which projects back into such a position that it may be readily reached and operated by the driver walking in the rear of the harrow. By this construction, by operating the lever G, the implement may be guided to follow the row, however crooked it may be, the resistance of the soil against the cutters E being sufficient to draw the harrow after them. To the bar C, over the ends of the side bars A, are attached the ends of the draft-chain H and the forward ends of the plow-beams I. The rear ends of the plow-beams I are curved downward and pass through eyes $j^1$, attached to or formed upon the rear sides of the plow-plates J, where they are secured in place by set-screws $j^2$, so that the said plow-plates can be adjusted to throw the soil toward or from the plants, as may be required. To the side of the arched middle part of the bar C is pivoted the forward end of the lever K, the rear end of which projects back into such a position that it may be conveniently reached and operated by the driver walking at the rear end of the harrow. To the forward part of the lever K is pivoted the end of a bar, L, that trails upon the ground, and which, when the rear end of the lever K is raised, swings forward into a vertical position, so that, by bearing down upon the said rear end of the lever K, the forward end of the harrow will be raised from the ground, allowing any grass, weeds, or other rubbish that may be caught upon the harrow-teeth B and the plows I J to drop off. To the end parts of the bar C are pivoted the ends of two bars, M, that drag upon the ground, so that when the forward end of the harrow is raised by the lever K and bar L, they may swing forward and support the said forward end, to allow any rubbish that may adhere to the teeth B and plows I J to be removed. The middle parts of the harrow-bars A are connected and held in proper relative position by a cross-bar, N, the middle part of which is raised to serve as a rest and slide for the lever G. The middle part of the cross-bar N is made with an offset at one end to give space for the lever K to operate, and to serve as a rest for said lever when not in use. The plows I J are held at such a distance apart as to work at any desired closeness to the row of plants by the jointed rods O, the inner ends of which are connected with the beams I, and their outer ends are slotted to receive the bolts by which they are secured adjustably to the harrow-beams A, so that, by loosening the said bolts, the said plows may be adjusted farther apart or closer together, as may be desired.

Having thus described my invention, what I claim as new, and desire to secure by Letters Patent, is—

1. The combination of the crank-axles D and the rotary cutters E with the bar C and the V-harrow A B, substantially as herein shown and described.

2. The combination of the cross-bar F and the lever G with the crank-axles D, the rotary cutters E, the cross-bar C, and the harrow A B, substantially as herein shown and described.

3. The combination of the lever K and pivoted bar L with the bar C, the V-harrow A B, and the plows I J, substantially as herein shown and described.

4. The combination of the pivoted bars M with the cross-bar C, the V-harrow A, the lever K, and the pivoted bar L, substantially as herein shown and described.

5. The combination of the cross-bar N, having its middle part raised, and an offset at the end of said raised middle part, in combination with the V-harrow A B and the levers G K, substantially as herein shown and described.

JOHN R. DUNLAP.

Witnesses:
SILAS W. WEST,
J. D. KEEDY.